Sept. 11, 1962   G. M. DUNN   3,053,226
BIRD HOUSE
Filed April 4, 1960   2 Sheets-Sheet 1
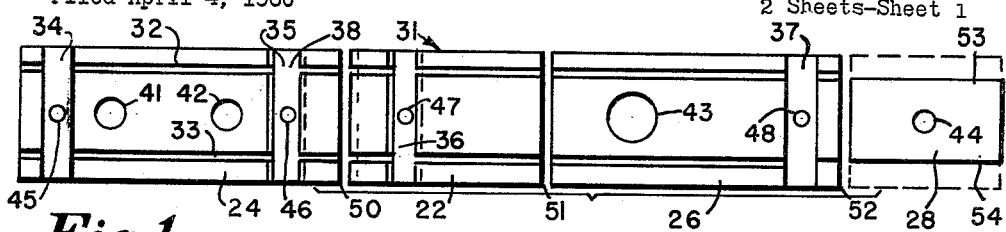
Fig.1.
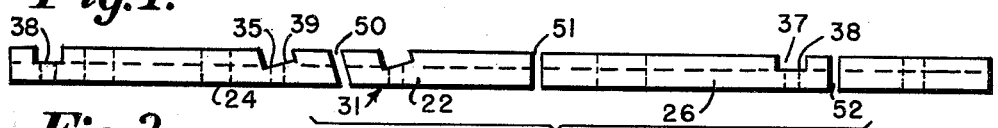
Fig.2.   Fig.3.   Fig.4.
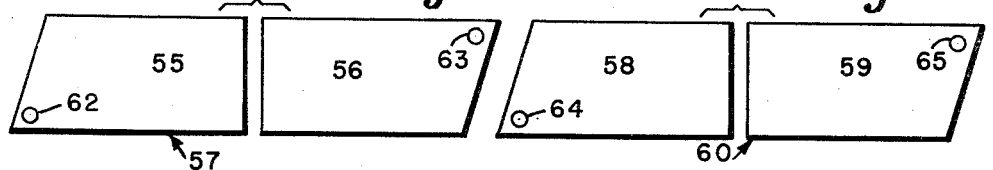
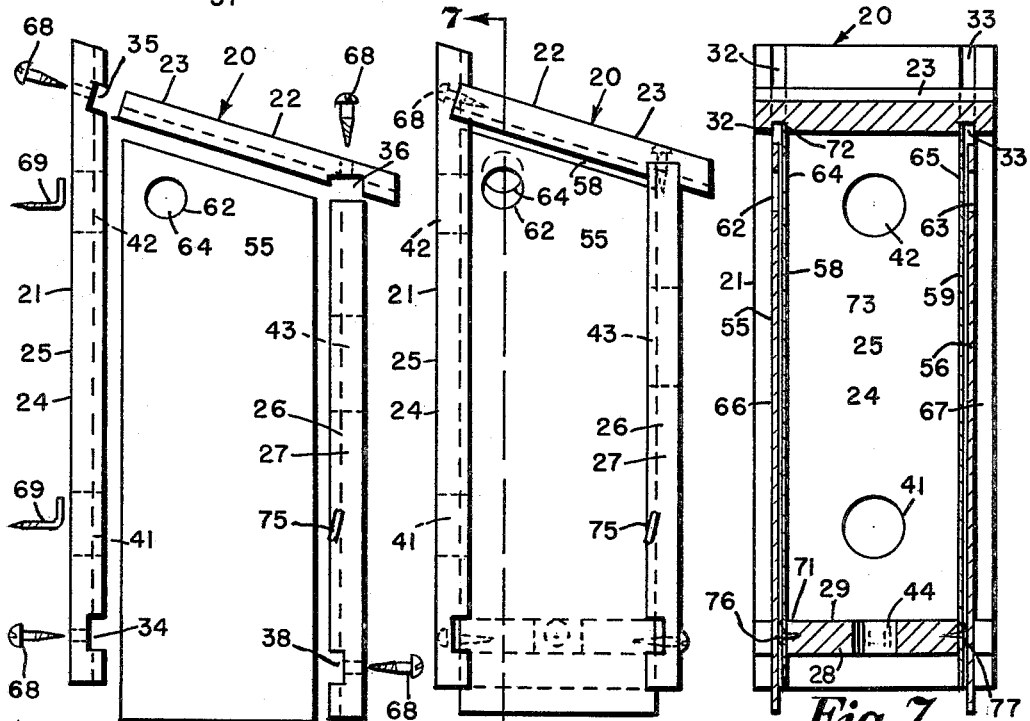
Fig.5.   Fig.6.   Fig.7.
INVENTOR.
GILBERT M. DUNN
BY
Pearson + Pearson
ATTORNEYS Sept. 11, 1962      G. M. DUNN      3,053,226

BIRD HOUSE

Filed April 4, 1960      2 Sheets-Sheet 2

INVENTOR.
GILBERT M DUNN
BY
*Pearson + Pearson*
ATTORNEYS

United States Patent Office 3,053,226
Patented Sept. 11, 1962

3,053,226
BIRD HOUSE
Gilbert M. Dunn, 14 E. Canal St., Penacook, N.H.
Filed Apr. 4, 1960, Ser. No. 19,808
5 Claims. (Cl. 119—23)

This invention relates to bird houses and to a method for making the same.

Bird houses are usually made of wood, with front and rear walls, a floor and a pitched roof, there being end, or side, walls fixed to the front and rear wall by nails or screws. In U.S. Patent No. 2,392,532 to Hyde of January 8, 1946, however, a transparent end wall is disclosed mounted in slotted strips and having a pivotable stop whereby it may be removed by downward sliding movement. The usual opaque end wall is also provided and it can be lowered or removed, to unmask the transparent window by removing the attachment screws. The opaque end wall and the transparent end wall are spaced from each other, both walls are spaced from the adjacent edge of the floor and both walls are spaced from the adjacent underface of the roof to provide upper and lower ventilation openings.

An object of this invention is to provide a bird house having doubled end walls, one transparent and one opaque, vertically slidable in the same groove and each slidably adjustable to any desired height relative to the other by the clamping action of a set screw.

Another object of the invention is to provide a plurality of flat, grooved panels capable of being assembled into a tubular figure with open ends and a plurality of flat end covers serving as slidable closures for the open ends, the panels and covers forming a compact package and being readily erected to form a bird house.

A further object of the invention is to provide an improved method for making a window wall bird house wherein all of the parts are formed of flat sheet material by milling, sawing, cutting or drilling, and only four screws and two hook eyes are required to assemble the device.

Still another object of the invention is to provide a low cost, rugged, bird house forming a rain and draft tight compartment and having mutually slidable end walls with ventilation apertures capable of adjustment from open to closed.

A still further object of the invention is to provide a bird house with a tubular body having open ends and doubled, apertured end covers for slidably opening or closing the ends, the tubular body being separated into multiple compartments by the use of multiple, apertured floors and multiple bird entrance holes.

Other objects and advantages of the invention will be apparent from the claims, the description of the drawing and from the drawing in which FIG. 1 is a diagrammatic plan view showing the method of making the roof, floor and wall panels of the bird house of the invention, FIG. 2 is a side view of the board shown in FIG. 1, FIGURES 3 and 4 are views similar to FIG. 1 showing the method of making the doubled, end covers of the bird house of the invention.

FIG. 5 is an exploded, end view, on an enlarged scale illustrating the manner in which the bird house of the invention is assembled into a closed tubular figure.

FIG. 6 is an end view of the bird house, illustrated in FIG. 5 assembled and showing the end opaque cover lowered to adjust the area of the ventilation opening in the transparent cover.

FIG. 7 is a front view in section on line 7—7 of FIG. 6.

Figure 8:
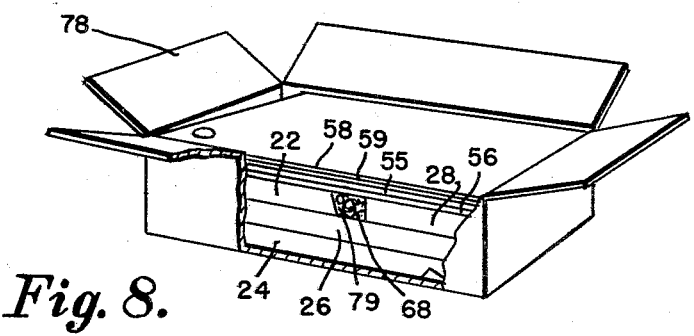
FIG. 8 is a diagrammatic perspective view showing the panels and covers of the prefabricated bird house shipped flatwise in a compact package.

As shown in the drawing, the bird house 20 of the invention comprises a unitary body 21 including a panel 22 forming a flat pitched roof 23, a panel 24 forming a vertical rear wall 25, a panel 26 forming a vertical front wall 27 and a panel 28 forming a floor 29. The panels 22, 24, 26 and 28 are formed from an elongated wood board 31, shown diagrammatically in FIGS. 1 and 2, which may be about five inches wide, five-eighths inch thick and about thirty-five inches long or any other suitable dimensions.

The first step in making the bird house 20 is the milling of a pair of laterally spaced, continuous, longitudinally extending cover grooves 32 and 33, each of rectangular channelled cross section and about one quarter inch deep, each groove being three eighths inch inwardly from the adjacent longitudinal edges of the board 31. The longitudinally spaced, laterally extending rabbet grooves 34, 35, 36 and 37 are then milled in the board 31, the bottom 38 of each groove 34 and 37 being parallel to the board 31 while the bottom 39 of each groove 35 and 36 is inclined relative to board 31 as shown in FIG. 2. The circular suspension apertures 41 and 42, the circular bird entrance aperture 43, the circular ventilation aperture 44 and the fastening screw holes 45, 46, 47 and 48 are then drilled or bored in the board 31. The board 31 is then cut or sawed laterally along the lines 50, 51 and 52 to form the individual panels 22, 24, 26 and 28 and the floor panel is cut longitudinally along the lines 53 and 54, defined by the inner walls of the grooves 32 and 33 so that the floor panel 28 is exactly equal in width to the distance between grooves 32 and 33.

A pair of identical, opaque end covers 55 and 56 are then cut, or sawed, from a flat, elongated strip 57 of opaque, rigid material such as thin wood, hard board or the like as shown in FIG. 3. A corresponding pair of identical transparent end covers 58 and 59 are then cut, or sawed, from a flat, elongated strip 60 of transparent, semi rigid material such as clear cellulose acetate, as shown in FIG. 4. The rigid opaque hard board 57 is about one eighth inch in thickness and the cellulose acetate 60 is about fifteen one thousandths in thickness so that an end cover of each material will easily slide in the grooves 32 and 33. At least one ventilation aperture such as 62, 63, 64 and 65 is drilled, bored or otherwise formed in each end cover, with the aperture such as 62 of each opaque cover 55 exactly in registration with the aperture 64 of the corresponding transparent cover 58 when the covers are doubled and superposed.

As shown in FIG. 5 the panels 22, 24, 26 and 28 are so rabbeted as to be easily erected into a closed tubular figure constituting the unitary body 21. Panel 24 becomes the rear wall 25, which is of predetermined height, for example twelve inches, panel 22 becomes the roof 23 which is pitched because the front wall 27 formed by panel 26, is of less height than wall 25, for example ten inches. Panel 28 becomes the floor 29 which extends horizontally between the vertical front wall 22 and the vertical rear wall 25, thus forming the closed tubular figure with open ends at 66 and 67.

Four wood screws, such as 68, are provided for affixing the roof 23, floor 29 and the parallel front and rear walls 25 and 27 together by means of the predrilled screw holes 45, 46, 47 and 48 at the rabbet joints. The device, when assembled to this point may be used as an open storm shelter if desired, and can be suspended on a post or wall by suitable hooks 69 in the suspension apertures 41 and 42.

The grooves 32 and 33 in the rear wall 25, roof 23 and front wall 27 are in registration and each end edge such as 71 of the floor 29 is flush with the adjacent inner wall 72 of the cover grooves so that the end covers may be slidably inserted upwardly into the grooves. A transparent end cover such as 58 slides on the inside of the groove and an opaque end cover 55 slides on the outside of the same groove so that the bird compartment 73 is normally masked but may become visible through the transparent cover 58 when the opaque cover 55 is lowered.

Set screw means, preferably in the form of a threaded hook eye 75, is provided for clamping the covers such as 55 and 58 together and against the wall 72 of the groove in completely closed position or in any desired slidable position relative to each other. As shown in FIG. 5 the covers are in overlying position so that the ventilation apertures 62 and 64 therein are in registration and fully open. As shown in FIGS. 6 and 7, to avoid drafts or to reduce circulation of air, the outside cover 55 may be lowered slightly relative to the inside cover 58 to reduce the size of the ventilation opening. It should be noted that there is no space between the end edges 71 of the floor 29 and the adjacent transparent covers 58 and 59 and that the covers are pressed into tight engagement therewith, thus avoiding leakage of air around the bottom of compartment 73. If desired, the transparent covers 58 and 59 may be further fixed in grooves 32 and 33 by a thumb tack such as 76 and 77 passing through the transparent material into an edge 71 of the floor.

In FIG. 8, the panels 22, 24, 26 and 28 and the covers 55, 56, 58 and 59 are shown in flatwise, superposed position as they may be shipped as a compact package in a suitable container 78. The screws 68, hooks 69 and hook eyes 75 may be enclosed in the plastic bag 79 as part of the package.

Figure 9:
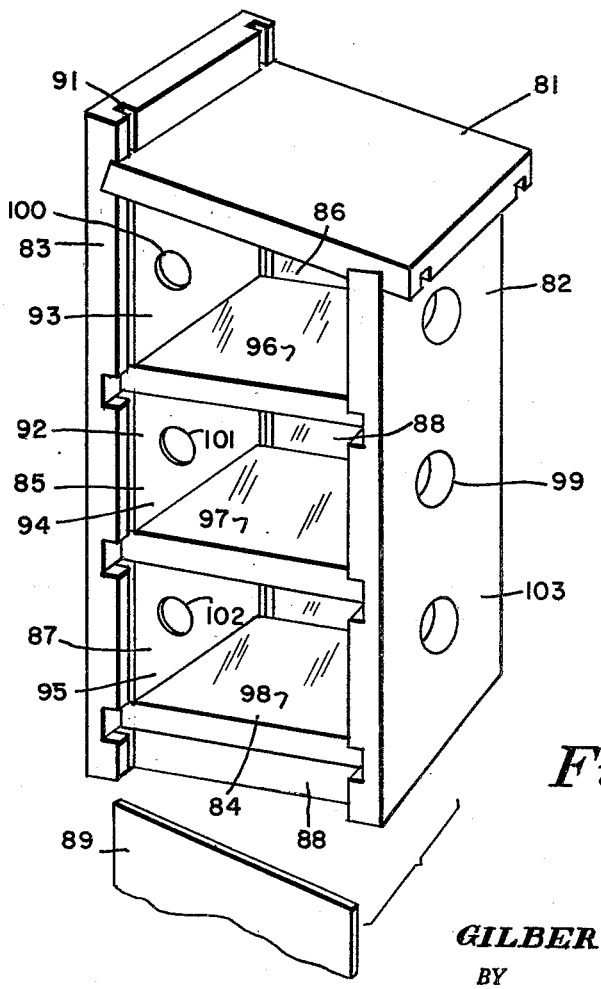
FIG. 9 is an end view in perspective, on an enlarged scale showing how multiple floors, and multiple bird openings convert the device into an apartment house for a colony of birds, the opaque end cover being removed for clarity.

In FIG. 9 a modification is shown wherein the roof 81, front wall 82, rear wall 83 and floor 84 are rabbeted to form a unitary body 85 in a closed tubular figure with open ends 86 and 87. Doubled transparent end covers such as 88 and opaque end covers such as 89 are provided for closing the ends 86 and 87, the covers being slidable in the cover grooves such as 91. In this modification the main compartment 92 is divided into multiple compartments 93, 94 and 95 by the multiple floors 96, 97 and 98 each rabbeted in the front wall 82 and in the rear wall 83. A bird entrance aperture such as 99 is provided for each compartment and registering ventilation apertures such as 100, 101 and 102 are provided in the covers for each compartment. The resulting bird house apartment 103 can house a colony of birds and still be made and packaged in the same manner as the bird house 20.

I claim:

1. A bird house comprising a vertical rear wall of predetermined height, a flat pitched roof, a vertical front wall of less height than, and parallel to, said rear wall and at least one horizontal floor extending between said walls; said roof, floor and walls being rabbeted to each other to form at least one closed tubular figure with openings at each opposite end and said roof, front wall and rear wall having a pair of registering, continuous grooves of rectangular cross section in the inner faces thereof, each groove proximate one of said opposite open ends and spaced apart a distance equal to the width of said floor; a first pair of opposite end covers of thin, transparent sheet material each mounted in one of said grooves and closing one of said open ends; a second pair of opposite end covers of thin, opaque, sheet material each slidably mounted in one of said grooves and closing one of said open ends while covering one of said transparent covers and set screw means in said walls operable to clamp each of said transparent end covers, and the adjacent opaque end cover, together and against the groove in which they are slidable for selectively adjusting the respective heights thereof.

2. A combination as specified in claim 1 wherein said floor includes a ventilation aperture and each said transparent cover, and its overlying opaque cover, include registering ventilation apertures therethrough proximate the top edges thereof.

3. A combination as specified in claim 1 plus detachable means in the end edges of said floor for supporting said first pair of end covers in said grooves independently of said set screw means.

4. A bird house comprising a unitary, tubular body having a roof; two opposite, vertical, parallel walls of predetermined height, the inner faces of said parallel walls each having a pair of opposite, laterally spaced, vertical grooves coextensive in height with said walls and of rectangular cross section and a floor having end edges terminating at said grooves, said tubular body having open ends; a pair of transparent end covers, each of less thickness than the width of one of said grooves and slidably mounted therein, each said transparent end cover being in contact with the adjacent end edge of said floor; a pair of opaque end covers, each identical in shape with one of said transparent covers and of less thickness than the width of said groove, each said opaque cover being slidably mounted in one of said grooves to overlie and mask one of said transparent covers and adjustable clamp means on said walls, for pressing the covers in each said groove together and against a wall of said groove.

5. A combination as specified in claim 4 wherein each said transparent cover and its overlying opaque cover include registering apertures pierced therethrough for ventilating said bird house.

References Cited in the file of this patent

UNITED STATES PATENTS 2,392,532     Hyde _____ Jan. 8, 1946

FOREIGN PATENTS 516,266     Great Britain _____ Dec. 28, 1939